United States Patent
Brandrud et al.

(10) Patent No.: US 7,380,013 B2
(45) Date of Patent: May 27, 2008

(54) METHOD FOR PROVIDING INFORMATION TO A WEB SERVER

(75) Inventors: Knut Brandrud, Oslo (NO); Marko Schuba, Aldenhoven (DE); Guido Zavagli, Tokyo (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 304 days.

(21) Appl. No.: 10/517,176

(22) PCT Filed: May 14, 2003

(86) PCT No.: PCT/EP03/05016

§ 371 (c)(1),
(2), (4) Date: Jul. 1, 2005

(87) PCT Pub. No.: WO04/002105

PCT Pub. Date: Dec. 31, 2003

(65) Prior Publication Data

US 2005/0257141 A1 Nov. 17, 2005

(30) Foreign Application Priority Data

Jun. 22, 2002 (EP) .................................. 02013844

(51) Int. Cl.
*G06F 15/16* (2006.01)
*H04L 9/00* (2006.01)
*G06F 7/00* (2006.01)
*H04M 1/66* (2006.01)
*H04M 11/00* (2006.01)

(52) U.S. Cl. ........................ 709/229; 713/153; 713/154; 713/155; 713/170; 707/10; 709/217; 709/218; 709/133; 455/411; 455/415; 379/93.02; 379/93.03; 379/93.12

(58) Field of Classification Search .................. 709/709, 709/217, 218, 219, 225, 227, 228, 229, 233, 709/235, 243, 245, 246; 455/411, 415; 379/93.02, 379/93.03, 93.12; 713/153, 154, 155, 170; 707/10
See application file for complete search history.

(56) References Cited

U.S. PATENT DOCUMENTS

| 5,875,296 | A | 2/1999 | Ault |
| 6,157,917 | A | 12/2000 | Barber |
| 6,836,845 | B1 * | 12/2004 | Lennie et al. ............... 713/181 |

FOREIGN PATENT DOCUMENTS

WO WO01/78351 * 10/2001

(Continued)

OTHER PUBLICATIONS

Mobiletransaction.org, "MET Authorization for account based payment using a SET Wallet Server" MET (Mobile Electronic Transactions) Standard; Feb. 21, 2001; pp. 1-15.*

(Continued)

*Primary Examiner*—Ashok Patel

(57) ABSTRACT

Access to information related to a client terminal is provided to a first web server, the information being stored by a second web server. The first web server is connected to the client terminal via a proxy server. The second web server sends a message, including a cookie, to the proxy server, wherein the cookie comprises a network address of the second web server. The cookie, related to the client terminal, is stored in the proxy server. The proxy server receives a message from the client terminal addressed to the first web server and the proxy server inserts the stored cookie into the received message. The proxy server forwards the received message to the first web server, which uses the cookie to request information from the second web server.

9 Claims, 2 Drawing Sheets

FOREIGN PATENT DOCUMENTS

| | | |
|---|---|---|
| WO | WO 01 93092 A | 12/2001 |
| WO | WO 02 17253 A | 2/2002 |

OTHER PUBLICATIONS

MET: "MeT Authorization for Account Based Payment using a SET Wallet Server" MET (Mobile Electronic Transactions) Standard; Feb. 21, 2001; pp. 1-15; XP002221755/.

MET: "MeT Authorization for account based payment using a SET Wallet Server" MET (Mobile Electronic Transactions) Standard; Feb. 21, 2001; pp. 1-15; XP002221755.

"SET Secure Electronic Transaction Specification, Book 1: Business Description" SET Specifications; May 31, 1997; XP002100669 p. 59.

* cited by examiner

METHOD FOR PROVIDING INFORMATION TO A WEB SERVER

FIELD OF INVENTION

The invention relates to method for providing to a web server information that is related to a client. The invention further relates to a proxy server, a program unit loadable into a proxy server, a web server, and a program unit loadable into a web sever, all of them to perform the invented method.

DESCRIPTION OF PRIOR ART

In the Internet a first web server can be connected to a client for providing a service to the client. The first web server may demand information related to the client that is held by a second web server. An example for the information related to the client is the acknowledgement of a mobile payment, that has to be performed before a service can be offered to the client by the web server. In this example the second web server can be a payment server e.g. a secure electronic transaction wallet server.

Further examples are an electronic mail held by an electronic mail server, an authentication to be performed by an authentication server, or an electronic ticket that is provided by a ticketing server. To access the information related to the client, the IP address of the second web server has to be provided to the first web server.

A solution to that problem was proposed in "Card Payment Transactions in an m-Commerce Environment—Feasibility Study" by Konrad Wrona and Terence Trench, Wireless Application Part Forum Meeting, Munich, $10^{th}$ to $15^{th}$ Dec. 2000. According to this solution, a mapping is provided between a network address of the client and the web address of the second web server in a third web server. This solution poses the problem of maintaining the third web server providing the mapping between the network address of the client and the web address of the second web server. This is especially difficult if the number of mappings between network addresses of clients and web addresses of web servers is high, and said functionality of mapping between the two address types has to be distributed within the network.

Therefore it is subject of the invention to present a simple method to provide information that is related to a client to a web server.

SUMMARY OF THE INVENTION

It is an advantage of the proposed method that the network address of the second sever is stored in a proxy server and only one proxy server is related to the client. This is advantageous as the network address of the second server can be maintained easily in the proxy server. Further advantageous is, that the network address of the second server is sent during a session between the client and the web server thus avoiding the need of contacting a third web server.

Advantageous is a method wherein the cookie is sent to the proxy server in a session according to a hypertext transfer protocol by the second web server. This is a simple method to provide the network address of the second web server to the proxy server as the second web server is holding its network address.

In another advantageous embodiment the request to the second web server is sent via the client. This is advantageous as the existing session between the client and the web server can be used for sending the request.

A simple method for requesting and providing information related to a client to a web server is especially required if the information authenticates or authorizes the client towards the web server.

DETAILED DESCRIPTION OF EMBODIMENTS

In the following the invention is described in more detail by means of embodiments and figures. Equal reference signs indicate equal elements.

Figure 1:
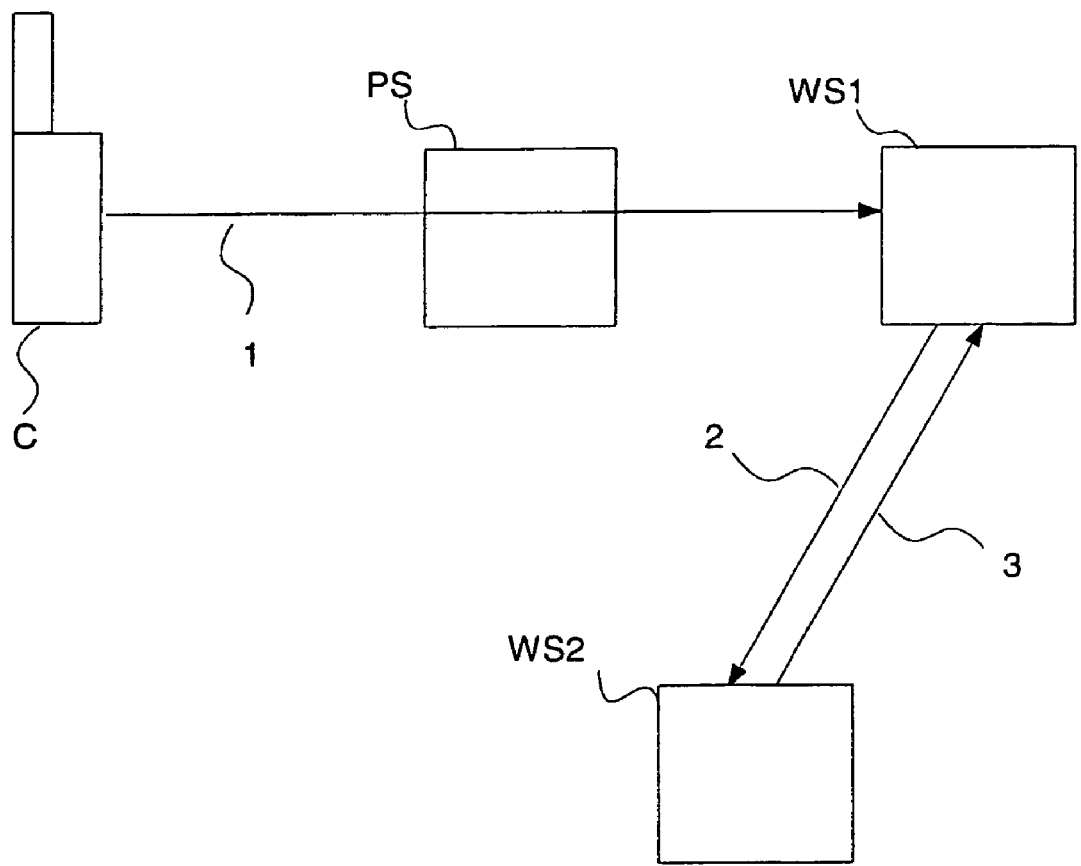
FIG. 1 shows an architecture and a signal flow using the invented method.

FIG. 1 depicts an example of an architecture and a signal flow for using the invented method. It shows a client C connected to a first web server WS1 via a proxy server PS. FIG. 1 further shows a second web server WS2. A message 1 that is sent from the client C to the first web server WS1, a request 2 from the first web server WS1 to the second web server WS2 and a response 3 from the second web server WS2 to the first web server WS1 are depicted as arrows. The contents of the message 1, the request 2 and the response 3 is described together with the description of the signal flow depicted in FIG. 2.

Figure 2:
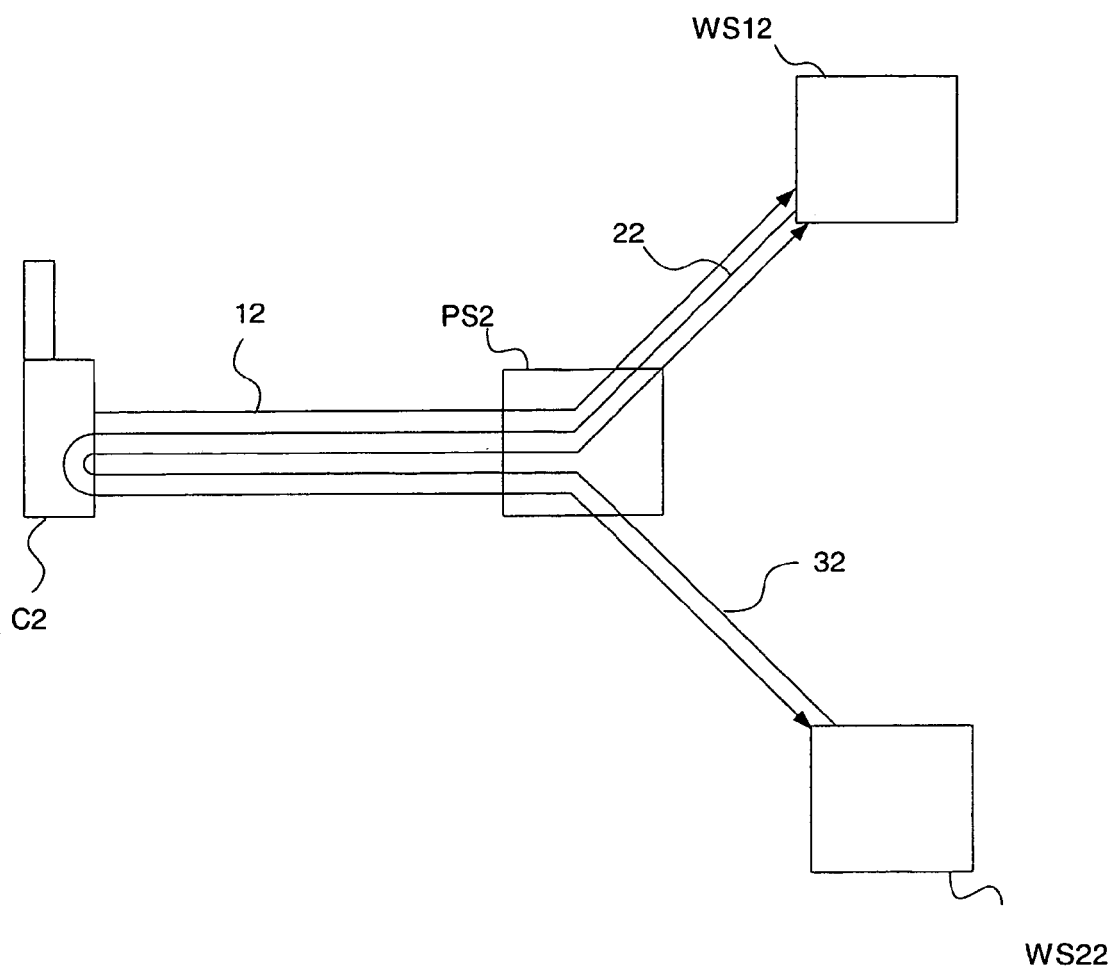
FIG. 2 shows an alternative signal flow using the invented method.

FIG. 2 depicts an alternative signal flow according to the invention. It shows a client C2 connected to a first web server WS12 and to a second web server WS22 via a proxy server PS2. The alternative signal flow contains a message 12 that is sent from the client C2 to the first web server WS12 via the proxy server PS2, a request 22 that is sent from the first web server WS12 to the second web server WS22 via the client C2 and a response 32 from the second web server WS22 to the first web server WS12 via the client C2. The message 12, the request 22 and the response 32 are depicted as arrows.

The client C, C2 can be a mobile terminal and the proxy server PS, PS2 can be a wireless application protocol gateway or a hypertext transfer protocol proxy server. The user of the client C, C2 is requesting a first service from a first service provider that is offering the service via a first web server WS1, WS12. The service can be a service for offering digital content, a service for supplying the user of the client C, C2 with a physical good or any other service. If the service is a service for offering digital content, the first web server WS1, WS12 can be for example a multimedia server storing multimedia streams. The user of the client C, C2 is subscribed at a second service provider that is offering a further service via a second web server WS2, WS22 to the user of the client C, C2. Said further service can be for example be a service for authentication or authorization or a service for electronic payments. The second web server WS2, WS22 can be for example an electronic mail server, an authentication server, a ticketing server, or a payment server such as a secure electronic transaction wallet server. The second web sever WS2 can e.g. provide rights related to a service provided by the first server WS1, WS12 to the user of the client C, C2. To this end the second web server WS2, WS22 can store authentication data, electronic tickets, or data related to electronic payments for the user of the client C, C2.

The client C, C2 establishes a connection to the second web server WS2, WS22 via the proxy server PS, PS2. If the client C, C2 is a mobile terminal and the proxy server PS, PS2 is a wireless application protocol gateway the connection between the client C, C2 and the second web server WS2, WS22 can comprise a first connection between the client C, C2 and the proxy server PS, PS2 over a wireless application protocol and a second connection between the proxy server PS, PS2 and the second web sever WS2, WS22 over a hypertext transfer protocol. Alternatively the proxy server PS, PS2 can be a hypertext transfer protocol proxy server and the connection between the client C, C2 and the second web server WS2, WS22 can comprise a first connection between the client C, C2 and the proxy server PS, PS2 over the hypertext transfer protocol and a second connection between the proxy server PS, PS2 and the second web sever WS2, WS22 via the hypertext transfer protocol. To provide connections according to the wireless application protocol to clients of a first kind and connections according to the hypertext transfer protocol to clients of a second kind the proxy server PS, PS2 can provide both the functionality of a wireless application protocol gateway and the functionality of a hypertext transfer protocol proxy server.

The second web server WS2, WS22 sends a message containing a cookie to the proxy server PS, PS2 in a session according to the hypertext transfer protocol, the cookie being related to the client C, C2 and the cookie comprising a network address of the second web sever WS2, WS22. The proxy server PS, PS2 stores the cookie for the first web server WS1, WS12.

The client C, C2 establishes a connection to the first web server WS1, WS12 via the proxy server PS, PS2, for example for receiving digital content from the first web server WS1, WS12.

The first web server WS1, WS12 demands information related to the client C, C2, the information being stored by the second web server WS2, WS22. The information can be for example a ticket allowing access to digital content provided by the first web server WS1, WS12 or information authenticating the user of the client C, C2 towards the first web server WS1, WS12. The information can authorize the user of the client C, C2 towards the first web server WS1, WS12 or the information can be related to a payment for a service, a physical good or digital content that is provided by the first web server WS1, WS12.

The client C, C2 sends a message 1, 12 towards the first web server WS1, WS12 via the proxy server PS, PS2. The proxy server PS, PS2 receives the message 1, 12, inserts the cookie into the message 1, 12 and forwards the message 1, 12 towards the first web server WS1, WS12 for providing the network address of the second server WS2, WS22 to the first web server WS1, WS12. The first web server WS1, WS12 receives the message 1, 12 containing the cookie, retrieves the network address of the second web server WS2, WS22 from the cookie and requests 2, 22 the second web server WS2, WS22 for the information related to the client C, C2. In the alternative signal flow according to FIG. 2 the request 22 to the second web server WS22 is sent towards the client C2 and redirected or forwarded by the client C2 to the second web server WS22.

The second web server WS2, WS22 sends the information related to the client C, C2 to the first web server WS1, WS12 in a response 3, 32. In the alternative signal flow according to FIG. 2 the response 32 is sent via the client C2. The first web server WS1, WS12 receives the information related to the client C, C2. The received information can authenticate or authorize the client C, C2 towards the first web server WS1, WS12. According to the information received from the second web server WS2, WS22 the first web server WS1, WS12 can decide to provide a service to the user of the client C, C2. The first web server can e.g. decide to provide access to a digital content, or supply a physical good to the user of the client C, C2 depending on the information received from the second web server WS2, WS22.

In a preferred embodiment of the invention a proxy server PS, PS2 for a communication network using the invented method comprises a memory for storing a cookie, interfaces for sending and receiving messages, and a processing system that that is adapted to receive in a session according to the hypertext transfer protocol a cookie comprising the network address of the second web server WS2, WS22. The processing system is adapted to store a cookie for the first web server WS1, WS12, wherein the cookie is related to the client C, C2 and comprises a network address of the second web server WS2, WS22. The processing system is adapted to receive a message 1, 12 that is addressed to the first web server WS1, WS12, to insert the cookie into the message 1, 12, and to forward the message 1, 12 to the first web server WS1, WS12.

A program unit for use of the proposed method is loadable into a proxy server PS, PS2 in a communication network. The program unit can for example be stored on a data carrier, e.g. a magnetic or optical recording medium. It can also be embodied as a sequence of signals loadable into a proxy server PS, PS2, e.g. over a data link. The program unit comprises code adapted to store a cookie for a first web server WS1, WS12, wherein the cookie is related to the client C, C2 and the cookie comprises a network address of a second web server WS2, WS22. The program unit is adapted to process messages, said messages comprising a message 1, 12 for the first web server WS1, WS12 from the client C, C2. The program unit further comprises code adapted to insert the cookie into the message 1, 12 and to forward the message 1, 12 towards the first web server WS1, WS12.

In a preferred embodiment of the invention a web server WS1, WS12 for a communication network using the invented method comprises interfaces for sending and receiving messages. The web server WS1, WS12 further comprises a processing system that is adapted to retrieve an address of a second web server WS2, WS22 from a cookie and to send a request for information related to a client C, C2 towards the second web server WS2, WS22.

A further program unit for use of the proposed method is loadable into a web server WS1, WS12 for a communication network. Said further program unit can for example be stored on a data carrier, e.g. a magnetic or optical recording medium. It can also be embodied as a sequence of signals loadable into a web server, e.g. over a data link. The further program unit comprises code adapted to process messages, said messages comprising a message 1, 12 from a proxy server PS, PS2 and a request 2, 22 towards a second web server WS2, WS22. The message 1, 12 from the proxy server PS, PS2 comprises a cookie with a network address of the second web server WS2, WS22. The request 2, 22 towards the second web server WS2, WS22 demands information related to the client C, C2. The further program unit comprises code adapted to retrieve the network address of the second web server WS2, WS22 from the cookie, and to send the request 2, 22 for information related to the client C, C2 towards the second web server WS2, WS22.

The invention claimed is:

1. A method for providing access to information related to a client terminal to a first web server, the information being stored by a second web server, wherein the first web server is connected to the client terminal via a proxy server, the method comprising the steps of:

the second web server sending a message, including a cookie, to the proxy server, wherein the cookie comprises a network address of the second web server containing information associated with the client terminal;

storing the cookie in said proxy server, the cookie being related to the client terminal;

the proxy server receiving a message from said client terminal that is addressed to the first web server;

the proxy server inserting the cookie into the received message, said cookie identifying said second web server; and forwarding the received message to the first web server wherein said first web server uses said cookie for requesting said information from said second web server.

2. The method according to claim 1, wherein the client terminal is a mobile terminal, the proxy server is at least one of a wireless application protocol gateway or a hypertext transfer protocol proxy server, and wherein the connection of the client terminal to the first web server further comprises the steps of:

establishing a first connection between the client terminal and the proxy server according to a wireless application protocol or a hypertext transfer protocol; and establishing a second connection between the proxy server and the first web server according to a hypertext transfer protocol.

3. The method according to claim 1 wherein said second web server includes an authentication server.

4. The method according to claim 1 wherein said second web server includes a payment server for said client terminal.

5. A proxy server for a communication network, wherein the proxy server comprises:

a memory for storing a cookie received from a second web server, said cookie is related to a particular client terminal and further including a network address identifying the second web server containing information associated with said client terminal;

interfaces for sending and receiving messages with said client terminal and a first web server; and means for receiving a signal from said client terminal further comprising means for:

modifying said received signal to include said stored cookie identifying said second web server; and forwarding said modified signal to said first web server allowing said first web server to use said cookie to request said information from said second web server.

6. The proxy server according to claim 5, wherein the client terminal is a mobile terminal, the proxy server is at least one of a wireless application protocol gateway or a hypertext transfer protocol proxy server, said server further comprising an interface means for establishing a connection between said client terminal with the first web server, wherein said interface means establishes a first connection between the client terminal and the server according to a wireless application protocol or a hypertext transfer protocol and establishes a second connection between the server and the first web server according to a hypertext transfer protocol.

7. The proxy according to claim 6 wherein said second web server includes an authentication server.

8. The proxy according to claim 6 wherein said second web server includes a payment server for said client terminal.

9. A computer program product within a computer usable medium coupled to a proxy server in a communication network, the computer program product comprising:

instructions within the computer usable medium for storing a cookie for a first web server wherein the cookie is related to a particular client terminal and includes a network address of a second web server containing information associated with the client terminal and wherein the cookie is sent to the proxy server by the second web server in a session according to a hypertext transfer protocol, and instructions within the computer usable medium for processing messages, said messages including a message for the first web server from the client terminal wherein the computer program further comprises instructions for inserting the cookie into the message and forwarding the message towards the first web server allowing the first web server to use the cookie to request the information from the second web server.

* * * * *